March 19, 1963
L. S. SCHWARTZ
3,081,548
BORE GAUGE
Filed Feb. 26, 1960
2 Sheets-Sheet 1
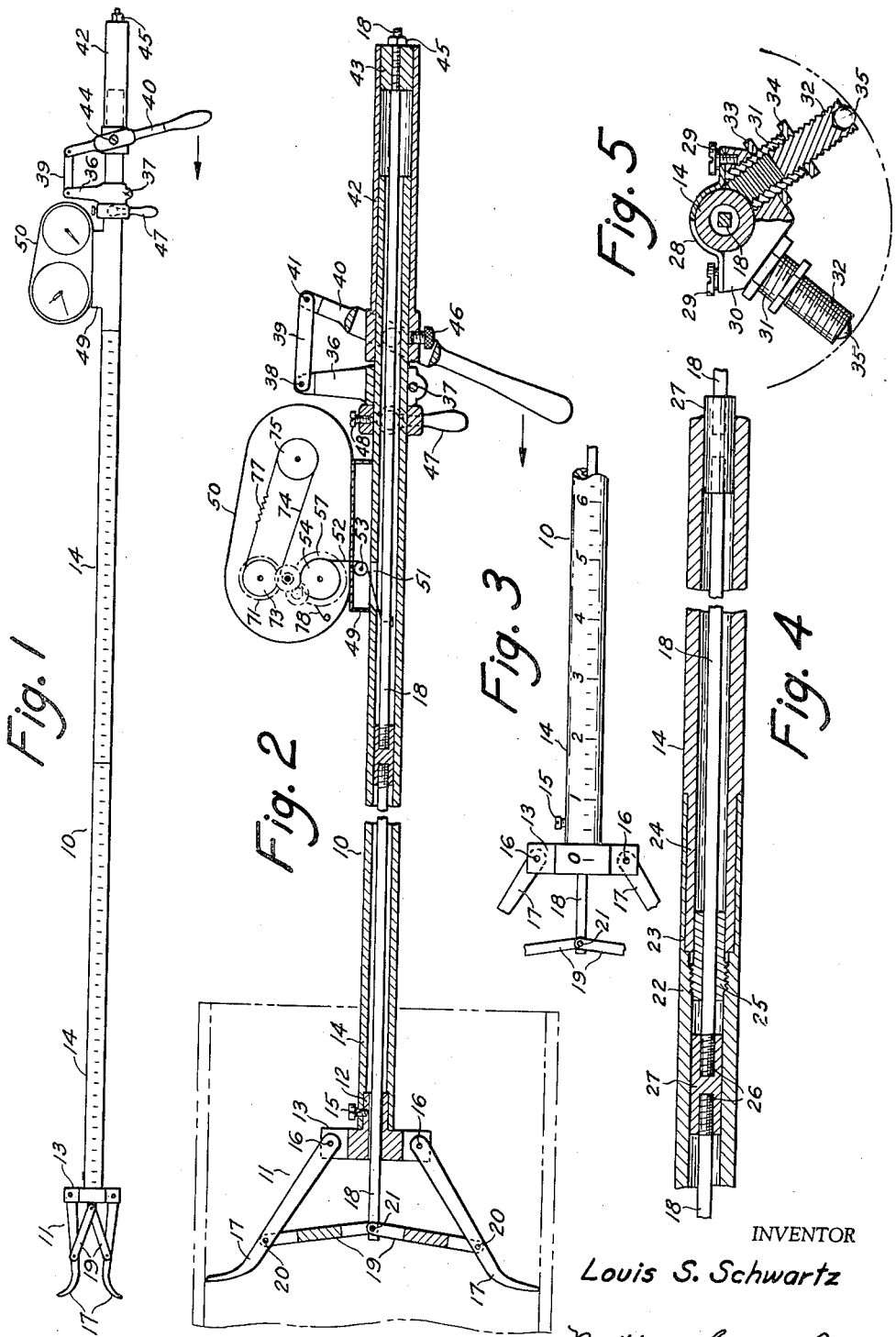
INVENTOR
Louis S. Schwartz
BY Natt M Emery Jr.
ATTORNEY March 19, 1963

L. S. SCHWARTZ 3,081,548

BORE GAUGE

Filed Feb. 26, 1960

INVENTOR
Louis S. Schwartz

BY Nat M Emery Jr.

ATTORNEY

United States Patent Office 3,081,548
Patented Mar. 19, 1963

3,081,548
BORE GAUGE
Louis S. Schwartz, Schnecksville, Pa., assignor to Bethlehem Steel Company, a corporation of Pennsylvania
Filed Feb. 26, 1960, Ser. No. 11,253
9 Claims. (Cl. 33—149)

This invention relates in general to a bore gauge and more particularly to a gauge for simultaneously (a) measuring the internal diameter of a tubular body and (b) determining the location of said such measurement longitudinally of the tubular body (i.e., the bore depth).

In the measurement of a cylindrical bore, the gauge should be capable of a quick and accurate determination of the bore diameter and the longitudinal distance to said diameter or bore depth without removing the gauge from the bore. In a gauge which measures bore diameter by means of contact elements which move in a plane perpendicular to the axis of the bore, the bore depth or longitudinal distance to the contact elements can be obtained directly from calibrations on the gauge. However, when a measuring head is used having caliper arms which move arcuately with respect to the axis of the gauge additional means must be provided to accurately measure the bore depth, because the longitudinal displacement of the caliper arms relative to the body of the gauge varies for different bore diameters. This invention provides such means in the form of a dial indicator and actuating means therefor which will cause the dial indicator to indicate the longitudinal displacement between the caliper arms and the calibrations on the gauge. The bore depth can then be determined by adding the reading of this dial indicator to the reading obtained from the calibrations on the gauge.

One of the objects of this invention is to provide an accurate gauge having caliper arms for measuring the internal bore without the necessity of removing the gauge from the bore.

Another object is to provide a gauge with a measuring head having caliper arms capable of indicating bore diameter and the bore depth to said diameter.

Still other and further objects of this invention will appear in the specification and claims.

In the drawings:

FIG. 1 is a top plan view of the gauge with the caliper arms in a closed position.

FIG. 2 is a longitudinal sectional view of the gauge on a larger scale with the dial indicator arrangement shown schematically and the caliper arms positioned in a bore to be measured.

FIG. 3 is a fragmental top plan view on a larger scale of the measuring head end portion of the gauge.

FIG. 4 is a sectional view of the arrangement for joining the body sections.

FIG. 5 is a view partly in section showing a supporting device fixed to the gauge body.

Figure 7:
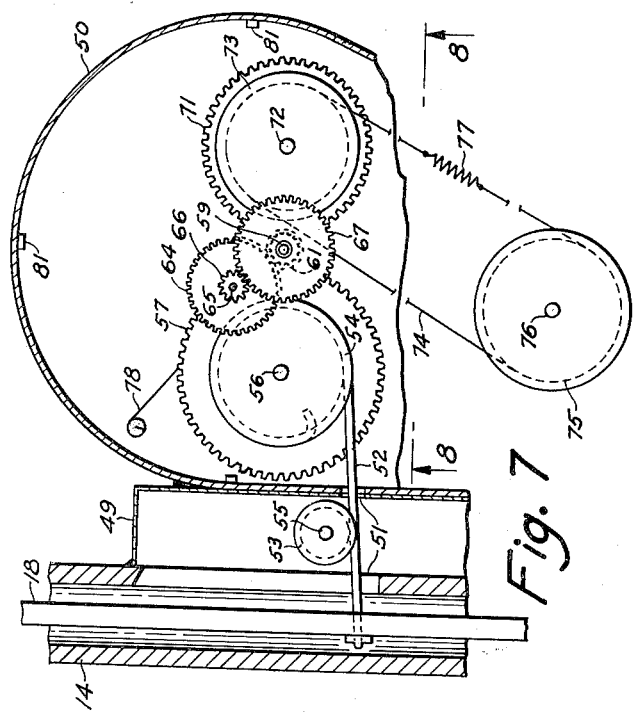
FIG. 7 is a fragmental longitudinal sectional view of the dial indicator end portion of the gauge with the cross member for supporting the various shafts and the dial pointers removed.

Referring now to the drawings and in particular FIGS. 1, 2 and 3, reference numeral 10 indicates an elongated body having a measuring head generally designated as 11 attached at one end by means of cylindrical portion 12 integral with base 13 and entering tubular casing 14. Set screw 15 is in threaded engagement with portion 12 and passes through casing 14 to maintain a fixed relation between the casing and the measuring head. Pivotally attached to the base by means of pins 16 are a pair of caliper arms 17. Extending from a point located intermediate the ends of each arm 17 to the square rod 18 which passes through a square hole in base 13 are links 19. Links 19 are adapted to receive pins 20 and 21 for pivotal attachment to the caliper arms and rod respectively. Thus, movement of rod 18 causes the caliper arms 17 to pivot about pins 16.

The elongated body 10 comprises a plurality of tubular casing sections 14 and rod sections 18 joined together. As shown in FIG. 3, the casing sections are calibrated in inches using the pivot point of arms 17, which is the center of pins 16, as the zero point of the calibration. These calibrations on the casing continue progressively to the juncture of the sections immediately adjacent the dial indicator. Thus, by the separation of the gauge at this juncture properly calibrated sections may be added or sections removed for measuring bores of various lengths.

As shown in FIG. 4, one end of a tubular casing section has a threaded bore enlargement 22 and a somewhat greater bore enlargement 23, the adjacent casing section has a reduced section 24 and a further reduced threaded plug section 25. In joining the tubular casing sections, reduced section 24 fits bore enlargement 23 and threaded plug section 25 fits thread bore enlargement 22. Threaded plug section 25 contains a square hole for supporting and preventing rotation of square rod 18 and is a force fit in the tubular casing. The square rod sections 18 are joined together by a coupling 27 which has an internal thread portion at each end to receive the external threaded portion 26 of the adjacent rod sections. The diameter and length of the coupling 27 is such as to permit a free fit with the bore of the tubular casing section while maintaining proper support for the rod.

In order to support the gauge in the bore to be measured, adjustable supports shown in FIG. 5 are attached to the body at suitable locations by means of clamp 28 and bolts 29. The support comprises a base 30 having a threaded hole for receiving threaded sleeve 31. The sleeve 31 in turn has a threaded bore for receiving threaded stud 32. Jam nuts 33 and 34 lock the sleeve and stud in position. In order to reduce friction and prevent damage to the bore surface to be measured, a ball 35 is inserted in the end of each stud 32. Thus, by adjusting the location of the threaded sleeve 31 and/or threaded stud 32 the height of the supports can be varied as desired.

As illustrated in FIGS. 1 and 2, a bracket-arm 36, which has an integral split ring section encircling the casing 14 and fixed thereto by means of bolt 37, is positioned adjacent the end of the body portion opposite the measuring head. Pivotally attached to the bracket-arm 36 by pin 38 is link 39 which extends and is pivotally attached to one end of operating lever 40 by means of pin 41. Located approximately between the ends of the operating lever is an integral enlarged section having an opening which encircles and is pivotally attached to cap 42 by means of bolt 44. Cap 42 extends over the end of the casing 14 and is in sliding contact therewith. Cap 42 has one end closed by a plug 43 having a bore for receiving a reduced threaded section of rod 18. Plug 43 is a force fit in cap 42. Nut 45 in threaded engagement with the end of rod 18 secures the rod to the cap 42. Thumbscrew 46 in threaded engagement with cap 42 extends through the cap and can be used to lock the cap in any desired position. Thus movement of operating lever 40 pivotally attached to cap 42 causes movement of rod 18 thereby opening and closing the caliper arms 17.

In order to facilitate handling and positioning of the gauge, a stabilizing handle 47 is fixed to the casing by means of an integral ring encircling the casing and held in position by set screw 48.

Figure 8:
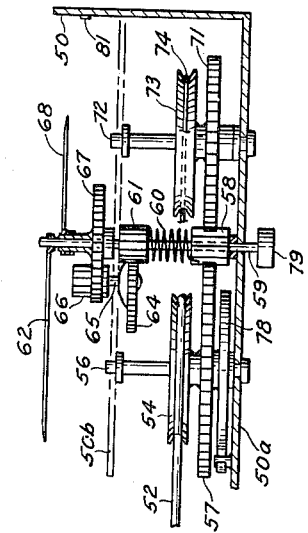
FIG. 8 is a sectional view substantially on line 8—8 of FIG. 7 with the cross member for supporting the various shafts shown schematically.

Attached to the elongated body adjacent to the stabilizing handle 47 is a dial indicator housing. This housing encloses and supports the arrangement for transforming the straight line motion of the rod 18 to the rotary motion of the dial indicator pointers. The housing comprises a substantially rectangular section 49 attached to the casing by welding or any other suitable manner and a substantially elliptical section 50, having a bottom portion 50a and a cross member 50b, attached to the rectangular section. With particular reference to FIGS. 7 and 8, an opening 51 is provided in the casing and housing through which flexible cable 52 passes and is fixed to rod 18. From rod 18, the flexible cable 52 extends over pulley 53 to larger pulley 54 and is fixed thereto. Pulley 53 is rotatably mounted on shaft 55 and larger pulley 54 is fixed to shaft 56 which is rotatably supported by the bottom 50a and cross member 50b (shown as a broken line in FIG. 8) of the elliptical housing 50. Fixed to shaft 56 and positioned below pulley 54 is a gear 57 which drives idler gear 58 mounted to rotate freely about shaft 59. Shaft 59 is rotatably supported by the bottom 50a and cross member 50b of elliptical housing 50. Idler gear 58 has fixed to its upper surface a compression spring 60 which encircles shaft 59 and provides a driving force to a pinion 61 fixed to shaft 59. Fixed to the top portion of shaft 59 is a pointer 62 which moves along bore diameter scale 63. Pinion gear 61 drives gear 64 which is fixed to one end of shaft 65. Fixed to the other end of shaft 65, which is rotatably supported by the cross member 50b, is pinion 66. Gear 67, which is free to rotate about shaft 59 and has pointer 68 attached to its upper hub, is driven by pinion 66. Pointer 68 traverses approximate bore diameter scale 69. The above description discloses the arrangement for providing rotary motion to pointers 62 and 68 for indicating the bore diameter.

In providing rotary motion to pointer 80, which moves along longitudinal distance scale 70, idler gear 58 drives gear 71 which is fixed to shaft 72 rotatably supported by the bottom 50a and cross member 50b. Also fixed to shaft 72 is pulley 73 which is connected by means of flexible cable 74 to pulley 75 fixed to shaft 76. Pointer 80, which moves along longitudinal distance scale 70, is fixed to shaft 76. Inserted between the ends of flexible cable 74 is a tension spring 77 which aids in maintaining contact between cable 74 and pulleys 73 and 75.

Both the bore diameter dial and the longitudinal distance dial are positioned under their respective pointers and supported by a series of lugs 81 projecting from housing 50. In order to prevent rotation of the dials one of the lugs 81 may be located so as to enter a slot in the dials.

In order to retract cable 52 and to return the pointers to their respective initial or starting positions after a bore measurement has been taken, coil spring 78 has one end fixed to shaft 56 and the other end fixed to the bottom 50a of elliptical housing 50. Spring 78 is coiled about shaft 56 in a manner such as to resist a clockwise rotation of pulley 54. In the event that the pointers do not return exactly to their respective initial or starting positions after completion of a bore measurement, a knurled knob 79 is provided on the lower end of shaft 59 and a similar knob on the lower end of shaft 76 for manually adjusting the pointers.

It is understood that in the above arrangement of gears and pulleys proper bearing surfaces will be provided between the various components.

Figure 6:
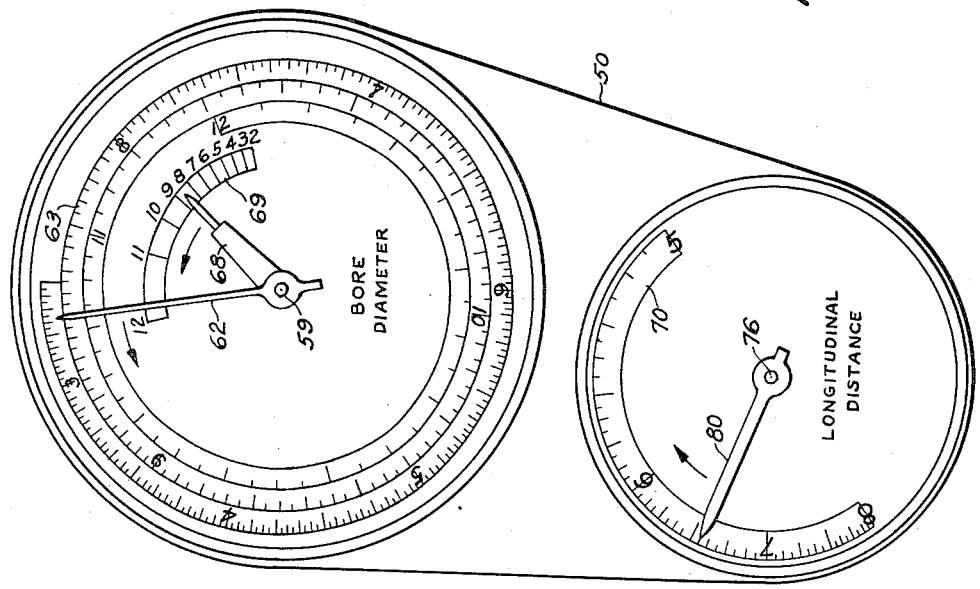
FIG. 6 is a top plan view of the dial indicators on a larger scale.

As shown in FIG. 6, the bore diameter dial contains two separate scales, 63 for exact bore diameter and 69 for approximate bore diameter. Both scales are calibrated so that the distance between graduations increases from the lower to the higher bore diameters. This is due to the progressively greater distance rod 18 must travel as the bore diameter increases. For the present example, scale 63 which is in the form of a spiral extends from 2½" to 12" with graduations of 1/32", and scale 69 extends from 2" to 12" with graduations of 1". In reading the bore diameter indicated in FIG. 6 the approximate bore diameter scale 69 is read first as being between 8" and 9". Then reading between 8" and 9" on the exact bore diameter secale 63, the bore diameter would be 8½". It should be understood that the above is by way of example and that various bore diameter ranges may be provided by varying the calibrations on the scales. It is also possible to eliminate the approximate bore diameter scale and visually count the revolutions of pointer 62 or provide an arrangement whereby pointer 62 is limited to one revolution.

As shown in FIG. 6, longitudinal distance scale 70 having pointer 80 is positioned adjacent the bore diameter scale and indicates the distance the caliper arms extend beyond the calibrations on the gauge. When the caliper arms are in a closed position, pointer 80 will be positioned at graduation 8 of the scale 70. As the caliper arms are opened for larger bore diameters, pointer 80 will move clockwise along scale 70 to the lower graduation. Thus, the longitudinal distance the caliper arms extend will vary inversely with the bore diameter. Whereas the distance between graduations on scale 63 increases from the lower to the higher bore diameters, the inverse is present on the longitudinal distance scale 70 and the distance between the graduations decreases from the lower to the higher longitudinal distances. Scale 70 extends from 8" to 5" with graduations of 1/16".

It will be apparent that numerous changes can be made in the arrangement for the operation of the dial indicators and in the calibration of the scales.

In the measurement of a bore, the proper number of calibrated body sections are joined together and the adjustable supports are set to a position so that the axis of the gauge coincides with the centerline of the bore. After the gauge has been placed at the desired position in the bore, movement of the operating lever 40 in the direction of the arrow in FIGS. 1 and 2 causes cap 42 and rod 18 to move in the same direction. This movement of rod 18 through links 19 causes caliper arms 17 to move about their pivot points 16 and contact the bore to be measured. This movement of rod 18 also causes flexible cable 52 to be unwound from pulley 54 and thus rotate pulley 54 and gear 57 both fixed to shaft 56. Gear 57 in turn drives idler gear 58 which is mounted freely about shaft 59. Compression spring 60, which is fixed to idler gear 58, drives pinion 61 which is fixed to shaft 59. This rotation of shaft 59 by pinion 61 causes pointer 62 fixed to shaft 59 to move along exact bore diameter scale 63. Pinion 61 also drives gear 64 fixed to shaft 65. Pinion 66 fixed to shaft 65 is thus rotated and in turn drives gear 67 mounted freely about shaft 59. Thus pointer 68, which is fixed to the hub of gear 67, moves along approximate bore diameter scale 69. Pinion 61, gear 64, pinion 66, and gear 67 form a gear reduction unit to reduce the relatively high number of revolutions of shaft 59 necessary for the exact bore diameter pointer 62 to the fractional revolution of approximate bore diameter pointer 68.

To provide rotation to pointer 80, which moves along longitudinal distance scale 70, idler gear 58 drives gear 71 which is fixed to shaft 72. Pulley 73 also fixed to shaft 72 is thus rotated and in turn provides rotation, through flexible cable 74, to pulley 75 fixed to shaft 76. Pointer 80 fixed to shaft 76 then moves along longitudinal distance scale 70.

The bore diameter is then determined by reading the exact bore diameter scale 63 between the graduations indicated by the approximate bore diameter scale 69. The depth of bore, at which the bore diameter is being measured, is determined by adding the reading from the calibrated body to the reading of longitudinal distance scale 70.

Although I have described my invention hereinabove in considerable detail, I do not wish to be limited narrowly to the exact and specific particulars disclosed, but I may also use such substitutes, modifications, or equivalents as are included within the scope and spirit of the invention or pointed out in the appended claims.

I claim:

1. A bore gauge comprising an elongated body, a pair of caliper arms pivoted at one end of said body, means at the other end of said body for actuating said arms, and means actuated by said actuating means for automatically indicating the distance between the ends of the caliper arms and their pivot points on a line parallel to the longitudinal axis of said body whereby the bore depth can be determined.

2. A bore gauge as described in claim 1 having calibrations on said elongated body.

3. A bore gauge as described in claim 1 having means to indicate bore diameter.

4. A bore gauge comprising an elongated body, a pair of caliper arms pivoted at one end of said body, means at the other end of said body for actuating said arms, and means actuated by said actuating means and including a dial indicator for automatically indicating the distance between the ends of the arms and their pivot points on a line parallel to the longitudinal axis of said body whereby the bore depth can be determined.

5. A bore gauge comprising an elongated body, a pair of caliper arms pivoted at one end of said body, means at the other end of said body for actuating said arms, and means actuated by said actuating means and including a dial indicator operated through a gear and pulley arrangement for automatically indicating the distance between the ends of the caliper arms and their pivot points on a line parallel to the longitudinal axis of said body whereby the bore depth can be determined.

6. A bore gauge comprising an elongated body, a pair of caliper arms pivoted at one end of said body, means including a rod slidably mounted in said body for actuating said arms, and means including a dial indicator actuated by said rod for automatically indicating the distance between the ends of the caliper arms and their pivot points on a line parallel to the longitudinal axis of said body whereby the bore depth can be determined.

7. A bore gauge comprising an elongated body, a pair of caliper arms pivoted at one end of said body, means including a rod slidably mounted in said body for actuating said arms, and means including a dial indicator actuated by said rod through a gear and pulley arrangement for automatically indicating the distance between the ends of the caliper arms and their pivot points on a line parallel to the longitudinal axis of said body whereby the bore depth can be determined.

8. A bore gauge for determining bore diameter and bore depth to said diameter comprising a calibrated elongated body, a pair of caliper arms pivotally connected to the end of said body, a rod slidably mounted in said body for actuating said arms, and two dial indicators actuated by said rod for determining the bore diameter and the distance said arms extend beyond their pivot points on a line parallel to the longitudinal axis of said body.

9. A bore gauge for determining bore diameter and bore depth to said diameter comprising a calibrated elongated body, a pair of caliper arms pivotally connected to the end of said body, a rod slidably mounted in said body for actuating said arms, and a flexible cable connected to said rod for actuating through a gear and pulley arrangement two dial indicators for determining the bore diameter and the distance said arms extend beyond their pivot points on a line parallel to the longitudinal axis of said body.

References Cited in the file of this patent

UNITED STATES PATENTS

| | | |
|---|---|---|
| 2,312,222 | Tanner | Feb. 23, 1943 |

FOREIGN PATENTS

| | | |
|---|---|---|
| 37,247 | Germany | Oct. 9, 1886 |
| 19,279 | Great Britain | Aug. 16, 1910 |